United States Patent Office 2,987,504
Patented June 6, 1961

2,987,504
POLYURETHANE RUBBER VIA STORABLE INTERMEDIATES
Kuno Wagner, Leverkusen, Germany, assignor, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed June 5, 1957, Ser. No. 663,616
Claims priority, application Germany June 8, 1956
6 Claims. (Cl. 260—75)

This invention relates to new storable compositions of matter which can be cured to form polyurethane rubber and to a process for the production of polyurethane rubber via these new storable compositions.

It is well known to produce polyurethane rubber by reacting polymeric compounds containing terminal hydroxyl groups, such as hydroxyl polyesters of the alkyd type and polyalkylene ether glycols, with aromatic diisocyanates and chain extenders (cross-linking agents), such as glycols, diamines or amino alcohols. In accordance with an important embodiment of this known process, the proportions of the components are so chosen that an isocyanate-modified polymer containing free hydroxyl and/or amino groups is obtained in the first stage of the reaction. These isocyanate-modified polymers are soluble and storable. They can be rolled out to form completely smooth sheets and converted into high molecular cross-linked polyurethane rubber by mixing with an additional amount of diisocyanate on a rubber mill and heating at temperatures within the range of about 100° to about 150° C. In this curing step, the reactants, i.e., storable intermediate and diisocyanate, are used in such proportions as to provide an excess of NCO groups over the hydroxyl and/or amino groups contained in the intermediate.

The compositions obtained by mixing the isocyanate-modified intermediates with excess diisocyanate on a rubber mill are not stable and must be processed without delay if the diisocyanate serving as the curing agent is one of the commonly used aromatic diisocyanates, which react with the hydroxyl and/or amino groups contained in the isocyanate-modified intermediate even at room temperature. Attempts have, therefore, been made to replace the reactive aromatic diisocyanates with diisocyanates of low reactivity in the curing step. However, even the most satisfactory polyurethane rubber-forming compositions heretofore produced, which contain dimeric toluylene-2,4-diisocyanate as the curing agent, cannot be stored indefinitely.

It is, therefore, a primary object of the present invention to provide new compositions which can be cured to form polyurethane rubber. Another object of the invention is to provide polyurethane rubber-forming compositions that can be stored over long periods. A further object of the invention is to provide compositions which can be processed very easily and which form polyurethane rubber having particularly desirable properties. A further object of the invention is to provide a process for the production of polyurethane rubber via the new storable compositions. Still further objects will appear hereinafter.

These objects are accomplished in accordance with the present invention by providing polyurethane rubber-forming compositions which contain (1) a storable isocyanate-modified polymer containing free hydroxyl and/or amino groups and (2) a mixture of cogeneric urea diisocyanates of the general formula (I) 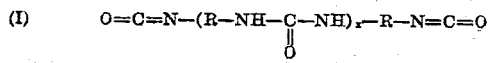

or mixtures of these urea diisocyanates with cogeneric urethane diisocyanates of the general formula (II) 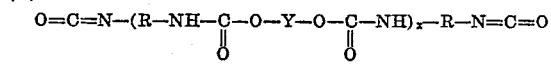

In these formulae, R stands for an aromatic radical which may be substituted, for instance, by chloro, alkyl or alkoxy groups, $x$ is an integer of from 1 to 5 and Y is either a linear or branched aliphatic radical, which may, if desired, contain hetero atoms, ester groups, urea groups and/or urethane groups, or an aliphatic-aromatic radical which is attached to the oxygen atoms by way of aliphatic radicals.

The compositions provided by the instant invention can be converted into polyurethane rubber of outstanding properties by the process described hereinbelow. It has been found that mixtures of cogeneric urea diisocyanates and mixtures of cogeneric urea diisocyanates with cogeneric urethane diisocyanates as contained in the polyurethane rubber-forming compositions of the invention have softening points as low as 110° to 165° C., and the new polyurethane rubber-forming compositions can be processed much more easily than compositions containing a high melting individual urea diisocyanate, such as N,N' - di - (4-methyl-3-isocyanato-phenyl)-urea (M.P. 181° to 182° C.). Another advantage of the polyurethane rubber-forming compositions provided by the instant invention resides in their excellent storability. The components of the new polyurethane rubber-forming compositions do not react with each other even at slightly elevated temperature and are surprisingly stable to humid air. Thus, homogeneous mixtures of N,N'-di-(4-methyl-3-isocyanato-phenyl)-urea with 15% to 55% of a urethane diisocyanate as produced from one mol of 1,4-butylene glycol or diethylene glycol and two mols of toluylene-2,4-diisocyanate do not change in their isocyanate content even when kept in a finely-ground condition for many weeks at a humidity of 80%. The same is true of urea diisocyanates containing 10% to 15% of higher homologues in a homogeneous distribution. Such mixtures can be ground to grain sizes as small as 10 to 50 microns without the exclusion of atmospheric moisture or other precautions and yet they will retain their original isocyanate content.

It is apparent from the above that the mixtures of urea diisocyanates or of urea diisocyanates and urethane diisocyanates which are contained in the polyurethane rubber-forming compositions of the invention show a behavior different from that of all heretofore used diisocyanates. It is believed that the unusual behavior of these mixtures may be attributed to a certain protective action of the hydrophobic urea diisocyanates and urethane diisocyanates of high molecular weight on the urea diisocyanates and urethane diisocyanates of low molecular weight. As a result, the reactivity of the latter, which is in itself low, is still further reduced.

Any mixture of urea diisocyanates corresponding to the above-indicated Formula I is suitable for use in the practice of the invention. Specifically, there may be used mixtures of N,N'-di-(4-alkyl-3-isocyanato-phenyl)-ureas containing in fine distribution 10% to 15% of polymer homologues in which $x$ equals 2 to 5, with those in which $x$ is 2 predominating. Such mixtures have a softening point from about 155° to about 165° C. There may also be used analogous mixtures of N,N'-di-(4-alkoxy-3-isocyanato-phenyl)-ureas and N,N'-di-(4-halogen-3-isocyanato-phenyl)-ureas with their polymer-homologues.

Any suitable urethane diisocyanate mixture may be admixed with the afore-mentioned urea diisocyanate mixtures. Representative examples of urethane diisocyanate mixtures useful in the process of the invention include the reaction products of one mol of a glycol with two mols of a diisocyanate, such as, for example, 1-methyl-benzene-2,4-diisocyanate, 1-chlorobenzene-2,4-diisocyanate and 1-methoxy-benzene-2,4-diisocyanate. As glycols which may be reacted with these or other diisocyanates to obtain suitable mixtures of urethane diisocyanates, there may be listed ethylene glycol, 1,3-propylene glycol, 1,2-propylene glycol, 1,4-butanediol, dipropylene glycol, 1,3-butylene glycol, diethylene glycol, triethylene glycol, tetrabutylene glycol, hexanediol, 2-ethyl hexanediol-(1,3), butane dihydroxy ethyl glycol, dimethylol xylenes, xylylidene glycols, N,N'-dihydroxy ethyl ureas and urethane glycols, such as the reaction product of 2 mols of ethylene glycol and 1 mol of 1-methyl-benzene-2,4-diisocyanate, and the beta,beta'-dihydroxy ethyl ether of 4,4'-dihydroxy diphenyl dimethane.

If urea diisocyanate-urethane diisocyanate mixtures are used in the process of the invention, the urethane polyisocyanates should be homogeneously distributed in the urea diisocyanates, preferably in amounts of from about 10% to about 55% by weight of the total mixture. Such mixtures have softening points between 110° and 165° C.

The urea diisocyanate mixtures which are employed in the process of the invention can be readily produced by reacting an organic diisocyanate with water in an amount of about 0.6 to about 0.8 mol per 1 mol of diisocyanate. This reaction is preferably carried out at room temperature and in an inert diluent which is a solvent for the diisocyanate employed and also for water but a poor solvent or a non-solvent for the urea diisocyanates formed. The diluent should also have a polymerization-inhibiting influence on diisocyanates. Any suitable diluent may be used for making urea diisocyanates including organic nitriles, aliphatic and cyclic ethers, esters, ketones, carbonates and amides. In particular, suitable diluents include acetone, aceto nitrile, tetrahydrofuran, dioxane, glycol monomethyl ether acetate, diethyl ether, ethyl acetate, butyrolactone, N-ethylpyrrolidone, N-ethyl succinimide and dimethyl formamide.

Urea diisocyanate mixtures suitable in the process of the invention can be readily prepared, e.g. according to the following examples:

Example A 696 parts by weight of 1-methyl benzol-2,4-diisocyanate are dissolved in 400 parts by volume of acetone. A solution of 36 parts by weight of water in 300 parts by volume of acetone is dropped in and the reaction mixture stirred at 20–25° C. After about 15 minutes carbon dioxide is evolved and a precipitate is formed. The mixture solidifies to a crystal mass within about 3 hours. The crystal mass when dried yields a powdery mixture consisting of about 88% N,N' - di - (4-methyl-3-isocyanato-phenyl)-urea and 18% of 1-methyl benzene-2,4-diurea-$N^\alpha N^\omega$ - methyl benzene-2,2'-diisocyanate. The mixture contains a minor amount of higher homologues of these urea diisocyanates. Softening point of the urea diisocyanate mixture 159–168° C.

Example B

In the procedure of Example A 2000 parts by volume of aceto nitrile are employed as solvent. The crystal mass is washed with benzene and dried. A urea diisocyanate mixture results consisting of about 70% of N,N'-di-(4 - methyl - 3 - isocyanato-phenyl)-urea and of 30% of 1-methyl benzene-2,4-diurea-$N^\alpha,N^\omega$-methyl benzene-2,2'-diisocyanate. Softening point 160–178° C.

Example C

A solution of 45 parts by weight of water in 300 parts by volume of acetone are dropped into a solution of 696 parts by weight of 1-methyl benzene-2,4-diisocyanate at a temperature of 20–25° C. while stirring. Within about 15 minutes a vigorous evolution of carbon dioxide starts under simultaneous precipitation of a crystal mass. The dried crystal mass consists of 45% of N,N'-di-(4-methyl-3-isocyanato-phenyl)-urea and of 55% of 1-methyl benzene - 2,4-diurea-$N^\alpha,N^\omega$-methyl benzene-2,2'-diisocyanate. Softening point 192–200° C.

Urea diisocyanate-urethane diisocyanate mixtures suitable for use in the process of the invention can be obtained by reacting a diisocyanate with a mixture containing water and a polyhydric alcohol, using the components in such proportions that the sum of the number of mols of water and polyhydric alcohol is less than 1 mol, preferably 0.5 to 0.8 mol per 1 mol of diisocyanate. This reaction, which is also preferably carried out at room temperature and in an inert diluent, is disclosed and claimed in co-pending application Serial No. 661,011, filed May 23, 1957, now abandoned.

Urea diisocyanate-urethan diisocyanate mixtures suitable in the process of the invention can be readily prepared, e.g. according to the following examples:

Example D

About 522 parts of 1-methyl benzene-2,4-diisocyanate are added at one time to a mixture of about 18 parts of water, about 31 parts of ethylene glycol and about 522 parts by volume of acetone. The reaction is kept at room temperature by gentle cooling. Violent evolution of carbon dioxide and progressive crystallization starts after a few minutes. By stirring well, the reaction mixture solidifies after about 1–2 hours to form a crystal magma, which gives off the entrained solvent by trituration in an open vessel or preferably by thorough mixing in a kneading device without additional supply of heat and is obtained in the form of a colorless powder with a yield higher than 95%. The urea diisocyanate-urethane diisocyanate mixture which is obtained is of low molecular weight and is readily soluble in dimethyl formamide, starts to soften at 157° C. and has an isocyanate content of 22.7%. 85% of the mixture consists of urea diisocyanates (with about 10% of higher homologues) and of 15% of urethane diisocyanate (with about 6% of higher homologues).

Example E

Using the procedure of Example D, there are employed about 383 parts of 1-methyl benzene-2,4-diisocyanate and a mixture of about 18 parts of water, about 10.6 parts of diethylene glycol and about 340 parts by volume of acetone. A urea diisocyanate-urethane diisocyanate mixture is obtained with a yield comparable to that of Example D. The mixture is readily soluble in dimethyl formamide, starts to soften at 155° C. and has an isocyanate content of 23.5%. The mixture consists of 88% of nearly pure N,N'-di-(4-methyl-3-isocyanato-phenyl)-urea and 12% of nearly pure urea diisocyanate prepared from 2 mols of 1-methyl benzene-2,4-diisocyanate and 1 mol of diethylene glycol.

Example F

The procedure is as in Example D, using about 522 parts of 1-methyl benzene-2,4-diisocyanate and a mixture of about 18 parts of water, about 53 parts of dimethylene glycol and about 530 parts by volume of acetone. An equally good yield is obtained of a completely dry pulverulent urea diisocyanate-urethane diisocyanate mixture of an isocyanate content of 19.3% which starts to soften at 145° C. 85% of the mixture consists of urea diisocyanates (with about 10% of higher homologues) and of 15% of urethane diisocyanate (with about 6% of higher homologues).

If desired, the above urea diisocyanate mixtures or urea diisocyanate-urethane diisocyanate mixtures can be employed in admixture with other simple organic polyisocyanates or so-called blocked or hidden polyisocyanates which are decomposed into free polyisocyanates by heating.

The isocyanate-modified polymers containing free hydroxyl and/or amino groups which are used as starting materials in the process of the invention are substantially linear and storable polyaddition products which may be produced by any suitable method. Illustrative examples of such isocyanate-modified polymers are the reaction products of (a) substantially linear hydroxyl compounds having a molecular weight within the range of about 300 to about 10,000, such as hydroxyl polyesters of the alkyd type, polyalkylene ether glycols, polythioethers containing oxygen and ether bridges and polyacetals consisting mainly of aliphatic components with (b) aromatic diisocyanates, such as 1,4-phenylene diisocyanate, naphthalene-1,5-diisocyanate, 4,4'-diphenyl methane diisocyanate, anisidine diisocyanate, benzidine diisocyanate and toluylene-2,4-diisocyanate, and (c) cross-linkers, such as glycols, hydroxy amines or diamines, or more specifically, diethylene glycol, 1,4-butylene glycol, dihydroxy ethyl urea, urethane glycols (such as reaction products of 1 mol of toluylene diisocyanate with 2 mols of glycol), quinitol, 1,5-naphthalene-beta,beta'-dihydroxy ethyl, 1,5-naphthalene dicarboxylic acid-beta,beta'-dihydroxy ethyl ester, hydroxy ethyl aniline, propanolamine, o-dichlorobenzidine, 1,5-naphthalene diamine, benzidine, chlorophenylene diamines, 4,4'-diamino diphenyl methane and others. As hydroxyl polyesters of the alkyd type, there are advantageously used those produced by thermal esterification of glycol, propylene glycol or diethylene glycol with succinic acid, adipic acid, sebacic acid and others, while polymerization products of alkylene oxides, such as ethylene oxide, propylene oxide and tetrahydrofuran may be used as polyethers. Suitable polythioethers are etherification products of thiodiglycol with butanediols, hydroxyethylated 1,4-butanediols or other polyols. The substances preferably used as polyacetals are those produced from formaldehyde and aliphatic diols or tetrahydrofuran polymers of low molecular weight.

The substantially linear hydroxyl polyesters, polyalkylene ether glycols, polythioethers or polyacetals used to make the isocyanate-modified polymers containing free hydroxyl and/or amino groups generally have hydroxyl numbers between 20 and 80, compounds having an hydroxyl number between 40 and 60 being preferred. This corresponds to an hydroxyl content of 0.6% to 2.4% and 1.2% to 1.8%, respectively.

The reaction of the hydroxyl polyesters, polyalkylene ether glycols, hydroxyl thioethers or polyacetals with the diisocyanate and the glycol, diamine or oxyamine used as chain extender (cross-linker) is carried out under substantially anhydrous conditions and at temperatures ranging from about 100° C. to 160° C. using the components in such proportions as to form a polymer containing free hydroxyl and/or amino groups. The isocyanate-modified polymers containing free hydroxyl and/or amino groups which are used as starting materials in the process of the invention can, for instance, be prepared according to one or other of the following examples:

*Example I*

200 parts of an adipic acid glycol polyester with an hydroxyl number of 60 and an acid number of 1 are dehydrated for 1 hour at 130° C. in a vacuum of 20 mm. 7 parts of 1,4-butylene glycol are then incorporated by stirring and the temperature is allowed to fall to 100° C. After stirring well, 25 parts of 1,4-phenylene diisocyanate are added. When a temperature of 125° C. is reached, the melt is forced out and heated for another 15 hours at 100° C. The storable polyester obtained in this manner is rolled out on a roller to form a smooth sheet.

*Example II*

200 parts of an adipic acid glycol polyester with an hydroxyl number of 56 and an acid number of 1, the said polyester having been dehydrated by heating in vacuo at 130° C. are mixed at 130° C. with 19.6 parts (1,2,4-)-toluylene-2,4-diisocyanate. The temperature rises to about 140° C. After cooling to 100° C. 10.8 parts of o-dichlorobenzidine are added; it quickly dissolves on stirring the mixture thoroughly. The viscosity rises considerably. After stirring for 10 minutes, the product is poured into a waxed metal shell and heated for 20 hours at 100° C. A storable chain-lengthened polyester which is readily soluble and which can be worked satisfactorily on a roller is obtained.

*Example III*

200 parts of an adipic acid ethyl glycol polyester with an hydroxyl number of 63 and an acid number of 1.5 are dehydrated in vacuo at 14 mm. and 100° C. for 30 minutes. 4 parts of 1,4-butanediol are then incorporated by stirring and after stirring well 26 parts of 1,5-naphthylene diisocyanate are added gradually at 110° C. After the temperature has risen and fallen again to 120° C. the mixture is poured out in the form of blocks and further heated for another 10 hours at 100° C.

*Example IV*

200 parts of adipic acid glycol polyester with an hydroxyl number of 56 and an acid number of 1.53 are dehydrated for 30 minutes at 130° C. and 14 mm. 11 parts of 1,5-naphthylene-$\beta,\beta'$-dihydroxy ethyl ether are thereafter dissolved in the melt and 21 parts of 1-methyl benzene-2,4-diisocyanate are added. The viscosity increases. After 10 minutes, the melt is forced out and heated for another 10 hours at 100° C.

*Example V*

200 parts of a tetrahydrofurane polyether with an hydroxyl number of 56 are dehydrated in vacuo. 7.4 parts of 1,4-butylene glycol are incorporated in the polyether by stirring at 100° C. and thereafter 33 parts of 1,5-naphthylene diisocyanate are added in portions. The viscosity rapidly rises. After 10 minutes the melt is poured into a waxed metal shell and heated for 3 hours at 100° C.

*Example VI*

200 parts of a polythioether produced from two mols of thiodiglycol and 1 mol of butanedihydroxy ethyl glycol and having an hydroxyl number of 74 have 7 parts of 1,4-butylene glycol incorporated therein at 130° C.; the temperature is allowed to drop to 100° C. and then 27 parts of p-phenyl diisocyanate are incorporated by stirring. After 10 minutes the melt is forced out and heated for another 15 hours at 100° C.

*Example VII*

1000 parts of a polyester of adipic acid, ethylene glycol and 1,2-propylene glycol with an OH number of 60 and an acid number of 1 are dehydrated for 1 hour in vacuo at 20 mm. and 100° C. 45 parts of quinitol are then stirred in and the temperature is allowed to drop to 100° C. After stirring well 125 parts of p-phenylene diisocyanate are added. When the temperature of 125° C. is reached, the melt is forced out of the mixer and heating is continued for a further 15 hours at 100° C. The storable polyester thus obtained is rolled out on a roller to a smooth sheet.

*Example VIII*

600 parts by weight of succinic acid propylene glycol-1,2 polyester with an hydroxyl number of 56 and an acid number of 0.8 which has been dehydrated by heating in vacuo to 130° C. is mixed at this same temperature with 49.7 parts of p-phenylene diisocyanate. After few minutes the reaction product gets viscous. After cooling to 100° C. 20.6 parts by weight of 1,5-naphthylene diamine are added. The viscosity increases very rapidly and the solid friable product obtained is heated for 20 hours at 100° C. The heated product is soluble in glycol monomethyl ether acetate and is capable of being rolled out satisfactorily to form a smooth sheet.

In order to prepare the polyurethane rubber-forming compositions of the present invention, a mixture of cogeneric urea diisocyanates or a mixture of cogeneric urethane diisocyanates with cogeneric urea diisocyanates of the type hereinabove described in mixed with a storable isocyanate-modified polymer containing free hydroxyl and/or amino groups in such proportions as to provide an excess of the free NCO groups contained in the urea diisocyanate- or urea diisocyanate-urethane diisocyanate mixture over the hydroxyl and/or amino groups present in the isocyanate-modified polymer. The mixing is carried out in the cold or at slightly elevated temperature in an appropriate kneading device, preferably on a rubber mill, and results in a composition that is still soluble and can be stored at room temperature or even at slightly elevated temperature without any appreciable cross-linking by a premature reaction of the free NCO groups contained therein. The further reaction and cross-linking with formation of a high-grade polyurethane rubber of low hardness and loading factors may be carried out at any desired later time, in a separate process step, by heating the polyurethane rubber-forming compositions of the invention to temperatures from about 100° C. to about 170° C., preferably while shaping. Curing and cross-linking can be effected by heat alone, it is, however, preferred to apply pressure of, for instance, 30–300 kg./cm.$^2$. With regard to the mechanical properties of the rubbery material the best results are obtained when the cured material is afterheated for some hours without application of pressure.

The urea diisocyanate- or urea diisocyanate-urethane diisocyanate mixtures used in the practice of the invention have the further advantage of showing no tendency toward polymerization reactions so that even in the presence of polymerization catalysts such as metal salts and tertiary amines, no interfering polymerization reactions take place in the cross-linking step.

The reaction of the isocyanate-modified polymers containing free hydroxyl and/or amino groups with a mixture of cogeneric urea diisocyanates or a mixture of cogeneric urethane diisocyanates with cogeneric urea diisocyanates is further illustrated by the following examples without being restricted thereto. Parts indicated are parts by weight.

*Example 1*

14 parts of the urea diisocyanate mixture of Example A are incorporated by rolling into 200 parts of a polymer prepared in accordance with Example I. The further processing to form a molded element can be carried out immediately or at a later stage. The cross-linking is effected at 150–160° C. in 30 minutes. After being stored for 24 hours at room temperature the product is again heated for 10 hours at 100° C. The mechanical properties of a plate molded from the product are as follows:

| | | |
|---|---|---|
| Thickness of the test plate | mm | 3 |
| Tensile strength | kg./cm.$^2$ | 374 |
| Breaking elongation | percent | 760 |
| Loading at 20% elongation | kg./cm.$^2$ | 10 |
| Loading at 300% elongation | kg./cm.$^2$ | 47 |
| Elasticity | percent | 49 |
| Shore hardness | degrees | 69 |
| Resistance to further tearing | kg./cm. | 43 |

*Example 2*

The procedure adopted is that indicated in Example 1 except that 22 parts of a homogeneous urea diisocyanate mixture of Example A are incorporated by rolling into 200 g. of the sheet material of Example I. A material having the following mechanical properties is obtained after the product has been worked unto a molded element:

| | | |
|---|---|---|
| Thickness of the test plate | mm | 3 |
| Tensile strength | kg./cm.$^2$ | 320 |
| Breaking elongation | percent | 665 |
| Loading at 20% elongation | kg./cm.$^2$ | 13 |
| Loading at 300% elongation | kg./cm.$^2$ | 84 |
| Elasticity | percent | 45 |
| Shore hardness | degrees | 75 |

*Example 3*

The procedure is as in Example 1, but the 1,4-butylene glycol is replaced by 9 parts of quinitol and after 14 parts of urea diisocyanate (Example A) have been incorporated by rolling into 200 parts of sheet (Example I) there is obtained a storable material which can be rolled out to form a smooth sheet and, after cross-linking, yields a material having properties similar to those indicated in Example 1.

*Example 4*

24 parts of a homogeneous urea diisocyanate mixture of Example A are incorporated by rolling into 200 parts of sheet material prepared according to Example II. After molding at 150° C. a molded element is obtained which has the following mechanical properties:

| | | |
|---|---|---|
| Thickness of test plate | mm | 3.2 |
| Tensile strength | kg./cm.$^2$ | 300 |
| Breaking elongation | percent | 670 |
| Loading at 20% elongation | kg./cm.$^2$ | 16 |
| Loading at 300% elongation | kg./cm.$^2$ | 100 |
| Elasticity | percent | 40 |
| Shore hardness | degrees | 80 |
| Resistance to tearing by needle test | kg./cm. | 80 |
| Resistance to further tearing | kg./cm. | 64 |

*Example 5*

Using the procedure indicated in Example 1 16 parts of the product of Example E are rolled into 200 parts of a sheet material according to Example I. A completely smooth sheet is obtained which has excellent storage properties.

*Example 6*

Using the procedure indicated in Example 1 30 parts of a homogeneous urea diisocyanate-urethane diisocyanate mixture prepared according to Example F are incorporated by rolling into 200 parts of a sheet material according to Example 1. A storable sheet is obtained which can be further processed at any desired time, for instance, can be molded to give shoe soles, balls, machinery equipments, or the like.

*Example 7*

Proceeding in a manner analogous to that indicated in Example 1, 30 parts of a homogeneous diisocyanate mixture with an isocyanate content of 23% are incorporated by rolling into 200 parts of sheet material (Example I). A smooth, soluble and storable sheet is obtained, which shows similar material values to those indicated in Example 1 after it has been pressed. The mixture is produced by reacting together 9 parts of 1,4-butane diol, 208.8 parts of 1-methyl benzene-2,4-diisocyanate and 9 parts of water and consists of 88% N,N'-di-(4-methyl-3-isocyanatophenyl)-urea (containing a small amount of higher homologues) and 12% of the corresponding urea diisocyanates.

*Example 8*

Using the procedure indicated in Example 1, 26 parts of a homogeneous diisocyanate mixture with an isocyanate content of 16% are incorporated by rolling into 200 parts of sheet material (Example I), the mixture consisting of 41 parts of N,N'-di-(4-methyl-3-isocyanatophenyl)-urea and 59 parts of a urethane diisocyanate mixture containing about 10% of higher homologues. The mixture is prepared similar to Example D from 696 parts of 1-methyl benzene-2,4-diisocyanate and 106 parts of diethylene glycol, and 18 parts of water. A smooth storable sheet is obtained, this sheet being soluble in glycol monomethyl ether acetate and in dimethyl formamide.

*Example 9*

A smooth sheet is prepared according of Example III and 30 parts of the diisocyanate mixture of Example 7 with an isocyanate content of 23% are incorporated into 200 parts of this sheet by rolling. Cross-linking is effected at 150° C. in 30 minutes. The product is then afterheated for about 10 hours at 100° C.

*Example 10*

16 parts of the urea diisocyanate mixture of Example A are incorporated by rolling into 200 parts of a polymer prepared in accordance with Example IV. The smooth sheet obtained is cross-linked while shaped at 150° C. for 30 minutes. The mechanical properties of a plate made from this product are as follows:

| | |
|---|---|
| Thickness of the test plate _____ mm__ | 3.8 |
| Tensile strength _____ kg./cm.² __ | 248 |
| Breaking elongation _____ percent __ | 750 |
| Loading at 20% elongation _____ kg./cm.² __ | 5 |
| Loading at 300% elongation _____ kg./cm.² __ | 30 |
| Shore hardness _____ degrees __ | 53 |
| Elasticity _____ percent __ | 41 |

*Example 11*

The procedure is as in Example 10. 14 parts of a urea diisocyanate mixture according to Example A are incorporated into 200 parts of the polymer prepared according to Example V. The material obtained exhibits the following mechanical properties:

| | |
|---|---|
| Thickness of test plate _____ mm __ | 3.5 |
| Tensile strength _____ kg./cm.² __ | 202 |
| Breaking elongation _____ percent __ | 455 |
| Elasticity _____ do ____ | 70 |
| Shore hardness _____ degrees __ | 80 |
| Permanent elongation _____ percent __ | 16 |
| Resistance to tearing by needle test _____ kg./cm. __ | 84 |
| Resistance to further tearing _____ kg./cm __ | 33 |

*Example 12*

20 parts of a homogeneous urea diisocyanate mixture of Example A are incorporated by rolling into 200 parts of sheet material prepared according to Example VI. After molding at 150° C. a molded element is obtained which exhibits good mechanical properties somewhat similar to those of Example 11.

While certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. A composition capable of forming a rubber-like polyurethane plastic comprising (a) a linear polyurethane polymer obtained from an organic diisocyanate and a member selected from the group consisting of hydroxyl polyesters obtained from a dicarboxylic acid and a glycol and poly(alkylene ether) glycols and having reactive groups selected from the class consisting of alcoholic hydroxyl groups and primary amino groups as the sole groups thereof reactive with —NCO groups and (b) a mixture of at least about 45 percent by weight of urea diisocyanate having the formula

OCN—R—NHCONH—R—NCO as essentially the sole monomeric diisocyanate and a urea diisocyanate having the formula OCN—(R—NHCONH)$_x$—R—NCO wherein R is a divalent aromatic radical obtained by removing the —NCO groups from an aromatic diisocyanate and x is an integer of from 2 to 5, at least about 10 percent by weight of said mixture being said urea diisocyanate having the formula OCN—(R—NHCONH)$_x$—R—NCO 2. The composition of claim 1 wherein said mixture of urea diisocyanates contains at least about 15 percent by weight of a urethane diisocyanate having the formula O=C=N—(R—NH—C—O—Y—O—C—NH)$_x$—R—N=C=O
       ‖                  ‖
       O                  O wherein R is a divalent aromatic radical obtained by removing the —NCO groups from an aromatic diisocyanate, x is an integer of from 1 to 5 and Y is a divalent organic radical obtained by removing the terminal hydroxyl groups from a linear dihydroxy organic compound selected from the group consisting of hydroxyl polyesters obtained from a dicarboxylic acid and a glycol and poly(alkylene ether) glycols and having a molecular weight within the range of from about 300 to about 10,000 and containing said hydroxyl groups as the sole groups thereof reactive with —NCO groups.

3. The composition of claim 1 wherein said linear polyurethane polymer is obtained from an organic diisocyanate and a poly(alkylene ether) glycol having a molecular weight within the range of from about 300 to about 10,000.

4. The composition of claim 1 wherein said linear polyurethane polymer is obtained from an organic diisocyanate and an alcoholic hydroxyl terminated linear polyester of a dicarboxylic acid and a glycol.

5. A process for forming a polyurethane plastic which comprises heating (a) a linear polyurethane polymer obtained from an organic diisocyanate and a member selected from the group consisting of hydroxyl polyesters obtained from a dicarboxylic acid and a glycol and poly(alkylene ether) glycols and having reactive groups selected from the class consisting of alcoholic hydroxyl groups and primary amino groups as the sole groups thereof reactive with —NCO groups and (b) a mixture of at least about 45 percent by weight of urea diisocyanate having the formula:

OCN—R—NHCONH—R—NCO as essentially the sole monomeric diisocyanate and a urea diisocyanate having the formula:

OCN—(R—NHCONH)$_x$—R—NCO wherein R is a divalent aromatic radical obtained by removing the —NCO groups from an aromatic diisocyanate and x is an integer of from 2 to 5, at least about 10 percent by weight of said mixture being said urea diisocyanate having the formula:

OCN—(R—NHCONH)$_x$—R—NCO to a temperature within the range of from about 100° C. to about 160° C. until a solid polyurethane plastic is obtained.

6. The composition of claim 1 wherein said poly-alkylene ether) glycol is a poly(alkylene etherthioether) glycol.

References Cited in the file of this patent

UNITED STATES PATENTS

| | | |
|---|---|---|
| 2,621,166 | Schmidt et al. | Dec. 9, 1952 |
| 2,725,385 | Seeger | Nov. 29, 1955 |
| 2,757,184 | Pelley | July 31, 1956 |
| 2,757,185 | Barthel | July 31, 1956 |
| 2,785,150 | Kreider et al. | Mar. 12, 1957 |
| 2,814,606 | Stilmar | Nov. 26, 1957 |
| 2,818,404 | Hill | Dec. 31, 1957 |
| 2,858,296 | Stilmar | Oct. 28, 1958 |
| 2,902,474 | Arnold et al. | Sept. 1, 1959 |

FOREIGN PATENTS

| | | |
|---|---|---|
| 872,268 | Germany | Mar. 30, 1953 |